(12) United States Patent
Murata et al.

(10) Patent No.: US 6,430,999 B2
(45) Date of Patent: Aug. 13, 2002

(54) SEMICONDUCTOR PHYSICAL QUANTITY SENSOR INCLUDING FRAME-SHAPED BEAM SURROUNDED BY GROOVE

(75) Inventors: Minoru Murata; Minekazu Sakai, both of Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/818,624

(22) Filed: Mar. 28, 2001

(30) Foreign Application Priority Data

Mar. 30, 2000 (JP) ........................................ 2000-097907
Jun. 19, 2000 (JP) ........................................ 2000-183266

(51) Int. Cl.[7] ............................................. G01P 15/00
(52) U.S. Cl. ................................................ 73/514.36
(58) Field of Search ....................... 73/514.01, 514.32, 73/514.36, 488, 514.38, 504.01

(56) References Cited

U.S. PATENT DOCUMENTS

| 5,880,369 A | 3/1999 | Samuels et al. | ......... 73/514.32 |
|---|---|---|---|
| 6,105,428 A | * 8/2000 | Schmiesing et al. | ...... 73/514.32 |
| 6,117,701 A | * 9/2000 | Buchan et al. | ................ 438/52 |
| 6,151,966 A | 11/2000 | Sakai et al. | ........... 473/514.032 |

OTHER PUBLICATIONS

U.S. application No. 09/247,865, Kato, filed Feb. 11, 1999.

* cited by examiner

*Primary Examiner*—Richard A. Moller
(74) *Attorney, Agent, or Firm*—Law Offices of David G. Posz (57) ABSTRACT

A semiconductor physical quantity sensor has a beam connecting a movable portion and a support substrate for displacing the movable portion in a displacement direction. The beam has a rectangular frame shape with a hollow portion and is surrounded by a groove. The groove has opposing intervals at both sides of the beam in the displacement direction, and the opposing intervals are equal to an interval of the hollow portion in the displacement direction. Accordingly, etching rates at the groove and the hollow portion become approximately equal to each other, reducing processing variation of the beam.

12 Claims, 7 Drawing Sheets

SEMICONDUCTOR PHYSICAL QUANTITY SENSOR INCLUDING FRAME-SHAPED BEAM SURROUNDED BY GROOVE

CROSS REFERENCE TO RELATED APPLICATIONS

This application is based upon and claims the benefit of Japanese Patent Applications No. 2000-97907 filed on Mar. 30, 2000, No. 2000-183266 filed on Jun. 19, 2000, the contents of which are incorporated herein by reference.

BACKGROUND OF THE INVENTION

1. Field of the Invention

This invention relates to a semiconductor physical quantity sensor having beams and a movable electrode that is displaced by deformation of the beams, and particularly to a semiconductor physical quantity sensor formed by etching a semiconductor layer provided on a support substrate.

2. Description of the Related Art

JP-A-11-326365 discloses a semiconductor physical quantity sensor. The semiconductor physical quantity sensor is composed of rectangular frame-shaped beams, a weight portion connected to the beams, comb-shaped movable electrodes integrated with the weight portion, and comb-shaped fixed electrodes disposed to face the movable electrodes. The beams are displaced in a specific direction by a physical quantity applied thereto, and the weight portion is displaceable together with the beams. This semiconductor physical quantity sensor is manufactured by forming grooves in a semiconductor layer provided on a semiconductor substrate by etching.

When the movable electrodes are displaced in the specific direction in accordance with a physical quantity (for example, acceleration) applied thereto, intervals between the movable electrodes and the fixed electrodes change so as to change capacitances therebetween. The applied physical quantity is then detected based on the changes in capacitances. In this case, the movements of the beams determine the changes in intervals between the movable electrodes and the fixed electrodes, which are caused by the application of the physical quantity. In this connection, it is very important to suppress processing variation of the beams.

SUMMARY OF THE INVENTION

The present invention has been made in view of the above problems. An object of the present invention is to provide a semiconductor physical quantity sensor that is composed of a fixed electrode fixed to a support substrate, and a movable electrode displaceable due to a frame-shaped beam, and that can be manufactured with reduced processing variation of the beam.

According to the present invention, a physical quantity sensor has a beam connecting a movable portion and a support substrate for displacing the movable portion in a displacement direction. The beam has a rectangular frame shape with a hollow portion and is surrounded by a groove. The hollow portion has a first interval in the displacement direction, and the groove surrounding the beam has second and third intervals at both sides of the beam in the displacement direction. Both of the second and third intervals of the groove are equal to the first interval of the hollow portion.

Accordingly, when the groove and the hollow portion are formed by etching, etching opening widths for the groove and the hollow portion of the beam are equal to each other because the first to third widths described above are equal to one another, resulting in approximately identical etching rata at etched portions. In consequence, processing variation of the beam can be reduced.

BRIEF DESCRIPTION OF THE DRAWINGS

Other features of the present invention will become more readily apparent from a better understanding of the preferred embodiments described below with reference to the following drawings, in which.

DETAILED DESCRIPTION OF THE PREFERRED EMBODIMENTS (First Embodiment)

Figure 1:
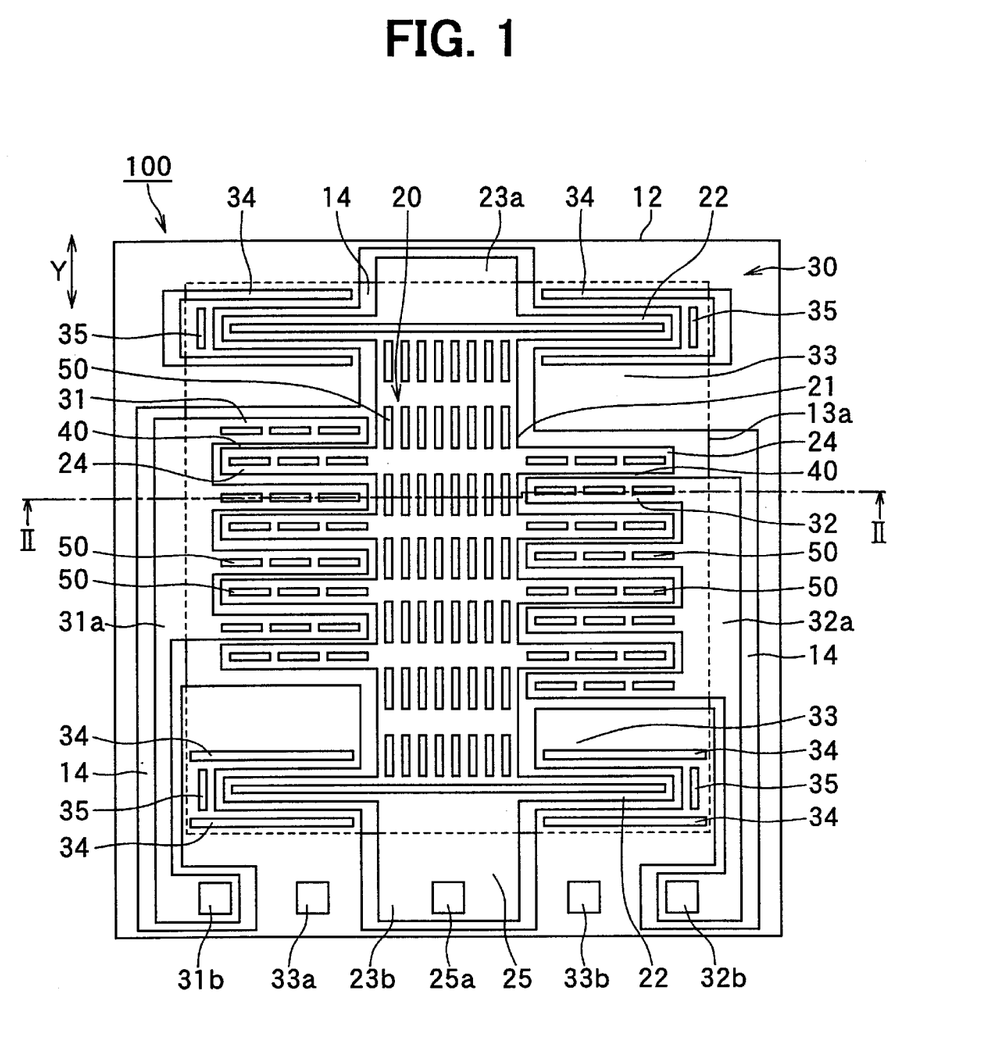
FIG. 1 is a plan view showing a semiconductor acceleration sensor according to a first preferred embodiment of the invention.
Figure 2:
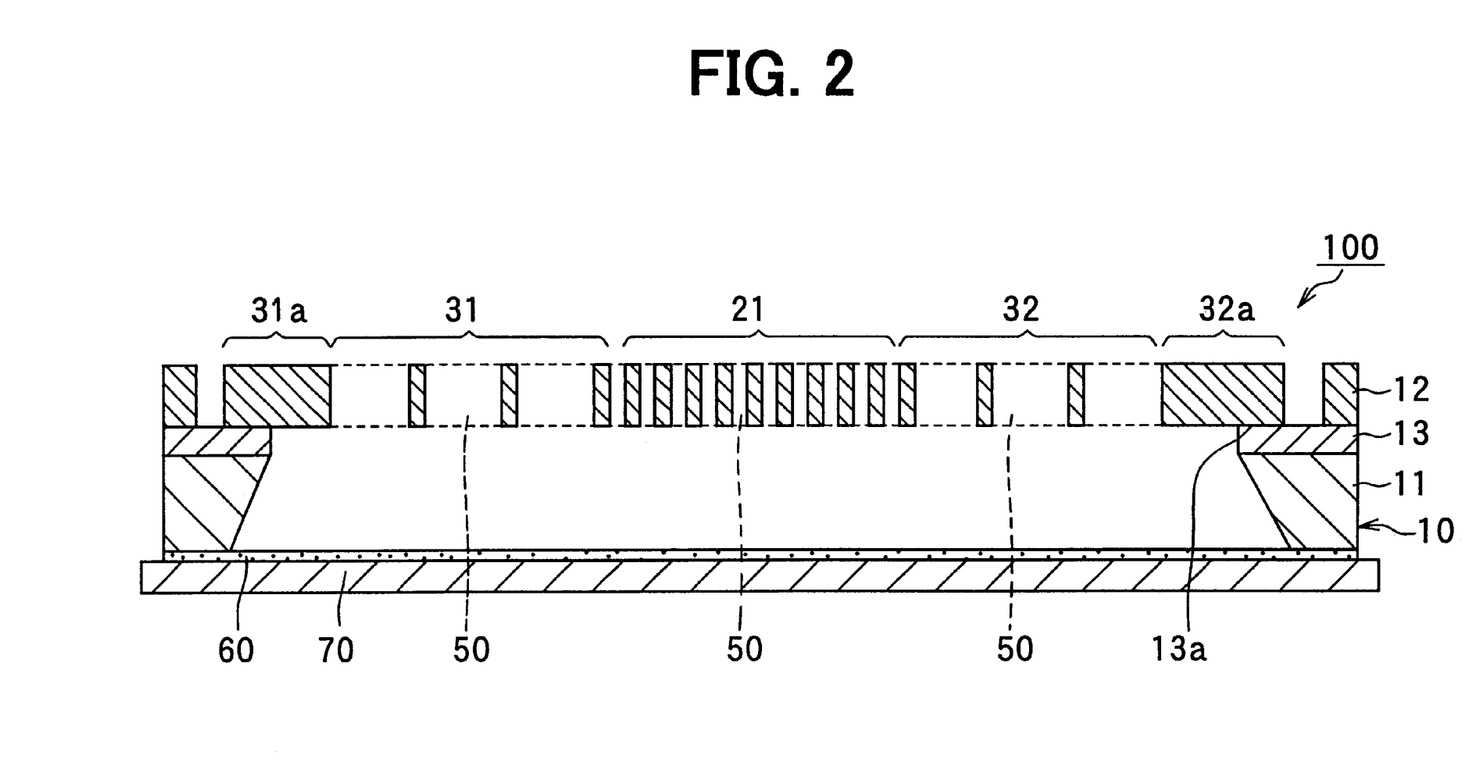
FIG. 2 is a cross-sectional view taken along line II—II in FIG. 1.

In a first embodiment, the present invention is applied to a differential capacitance type semiconductor acceleration sensor 100 shown in FIGS. 1 and 2, as a capacitance type semiconductor physical quantity sensor. The semiconductor acceleration sensor 100 can be applied to a vehicular acceleration sensor or a gyro sensor for controlling an air bag system, ABC, VSC, and the like.

The sensor 100 is manufactured by processing a micromachine technique to a semiconductor substrate. The semiconductor substrate constituting the sensor 100 is, as shown in FIG. 2, a rectangular SOI substrate 10 composed of composed of a first silicon substrate (support substrate) 11 as a first semiconductor layer, a second semiconductor substrate 12 as a second semiconductor layer, and an oxide film 13 as an insulating layer interposed between the first and second silicon substrates 11 and 12.

The second silicon substrate 12 has a beam structure composed of a movable portion 20 and a fixed portion 30 separated from the movable portion 20 by a groove 14. The oxide film 13 and the first silicon substrate 11 are formed with a rectangular opening 13a formed by etching at a portion corresponding to the region where the beam structure 20, 30 is formed. The fixed portion 30 is supported by the first silicon substrate 11 through the oxide film 13 at the edge portion of the opening 13a.

The movable portion 20, which is provided across the opening 13a, has a weight portion 21, both ends of which are integrally connected to anchor portions 23a, 23b through beams 22. The anchor portions 23a, 23b are fixed to the oxide film 13 at the edge portion of the opening 13a, and are supported by the first silicon substrate 11. The weight portion 21 and the beams 22 face the opening 13a.

Each of the beams 22 has a rectangular frame shape and has a spring function that acts in a direction perpendicular to a longitudinal direction thereof. Specifically, when the beams 22 receive acceleration containing a component in arrowed direction Y shown in FIG. 1, the beams 22 displace the weight portion 21 in the direction Y and restore the weight portion 21 to its initial position in accordance with the disappearance of the acceleration. Thus, the weight portion 21 can be displaced above the opening 13a in the displacement direction of the beams 22 (corresponding to the arrowed direction Y, and hereinafter referred to as displacement direction Y) in accordance with the acceleration applied thereto.

Comb-shaped movable electrodes 24 are provided on both sides (right and left sides in FIG. 1) of the rectangular weight portion 21 parallel to the displacement direction Y, and respectively protrude in opposed directions with respect to each other, perpendicularly to the displacement direction Y. In FIG. 2, the movable electrodes 24 include four movable electrode members at each (right or left) side of the weight portion 21, and each of the movable electrode members has a beam-shape with a rectangular cross-section and faces the opening 13a. The movable electrodes 24 thus integrated with the weight portion 21 can be displaced together with the beams 22 and the weight portion 21 in the displacement direction Y.

The fixed portion 30 has comb-shaped fixed electrodes 31, 32 disposed to be opposed to each other, and to engage with the respective comb-shaped movable electrodes 24 at the right and left sides of the weight portion 21. The fixed electrodes 31, 32 interpose the weight portion 21 therebetween, and are composed of a first fixed electrode 31 provided at the left side in FIG. 1 and a second fixed electrode 32 provided at the right side in FIG. 1.

The first and second fixed electrodes 31, 32 are electrically independent of each other, and respectively have fixed electrode members (each four in the figure) each of which has a beam-shape with a rectangular cross-section. The first and second fixed electrodes 31, 32 are respectively cantilevered by the first silicon substrate 11 at wiring portions 31a, 32a, and face the opening 13a in that state. Each of the fixed electrode members of the fixed electrodes 31, 32 has a side face that faces a side face of one of the movable electrode members with a specific interval (detection interval) 40. The side faces of the fixed and movable electrode members defining the detection interval 40 therebetween extend in parallel with each other.

Figure 3A:
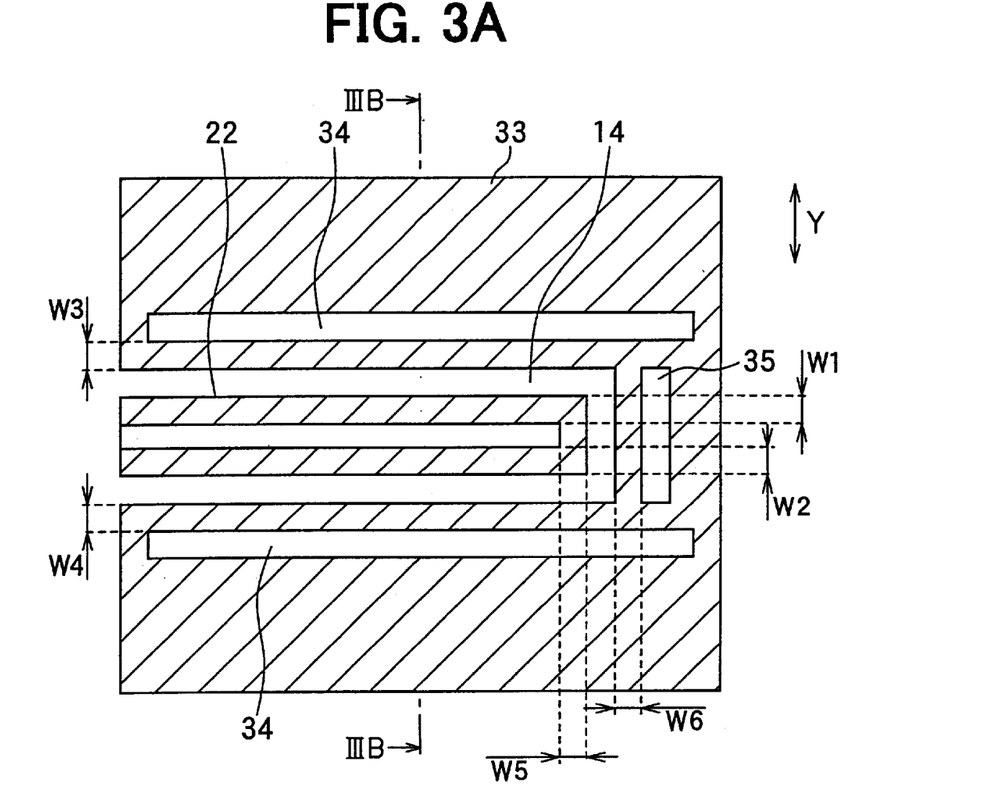
FIG. 3A is an enlarged view showing a beam and a beam peripheral portion facing the beam.
Figure 3B:
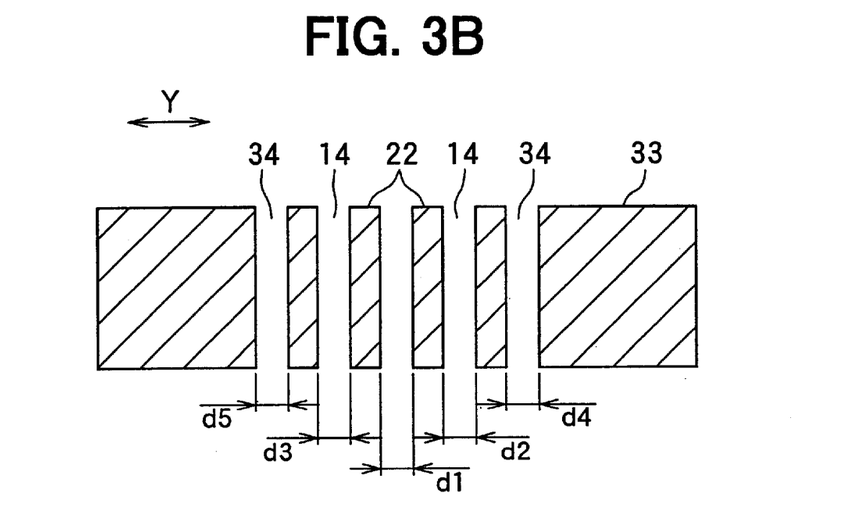
FIG. 3B is a cross-sectional view taken along line IIIB—IIIB in FIG. 3A.

The fixed portion 30 further includes beam peripheral portions (beam peripheral fixed portions) 33 that surround and face the beams 22 through the groove 14. The beam peripheral portions 33 are separated from the fixed electrodes 31, 32 by the groove 14 and are formed to be electrically independent of the movable portion 20 and the fixed electrodes 31, 32. Here, FIGS. 3A and 3B show a vicinal region of the beam 22 and the beam peripheral portion 33 at the lower side in FIG. 1. Although FIG. 3A shows a plan view thereof, the portion of the second silicon substrate 12 is hatched to be distinguished easily.

In FIG. 3B, d1 denotes a width (interval) of a hollow portion of the frame-shaped beam 22 in the displacement direction Y, and d2 and d3 respectively denote opposing intervals between the beam 22 and the beam peripheral portion 30 (that is, the widths of the groove 14 forming the opposing intervals) at the both sides of the beam. In the sensor 100, the width d1 and the opposing intervals d2, d3 are set to be equal to one another, i.e., to satisfy a relation of d1=d2=d3.

Further, as shown in FIG. 3A, openings 34 are formed in the beam peripheral portion 33 by removing the second silicon substrate 12 so that parts of the beam peripheral portion 33 facing the beam 22 in the displacement direction Y remain to have widths W3, W4. In this embodiment, the widths W3, W4 and the widths W1, W2 of the frame-shaped beam 22 are set to be equal to one another, i.e., to satisfy a relation of W1=W2=W3=W4.

Furthermore, the opposing intervals d2, d3 between the beam 22 and the beam peripheral portion 33, the width d1 of the hollow portion of the beam 22, and the widths (intervals) d4, d5 of the openings 34 are made equal to one other to satisfy a relation of d1=d2=d3=d4=d5. For example, the dimensions d1 to d5 are made equal to one another in a range of 2.m to 4.m, and the dimensions W1 to W4 are made equal to one another in a range of 3.m to 5.m.

Incidentally, as shown in FIG. 1, the openings 34 are provided at the upper and lower sides of the beam 22 in the displacement direction Y and are integrated with each other (communicate with each other) around the beam 22 at the side of the upper anchor portion 23a. On the other hand, as shown in FIGS. 3A and 3B, at the side of the lower anchor portion 23b, the openings 34 are separated from each other as upper and lower rectangular openings around the beam 22. These structures are defined in consideration of formation spaces, strengths and the like of the openings 34; however, the openings 34 may be integrated with one another or may be separated from each other at either side.

Further, as shown in FIG. 3A, at the portion of the beam peripheral portion 33 facing the beam 22 in the direction perpendicular to the displacement direction Y, an opening 35 is formed by removing the second silicon substrate 12 and defines the part having width W6 and facing the end portion of the beam 22. The width W6 is set to be equal to width W5 of the end portion of the beam 22. The widths W5, W6 are also set to be equal to each other in a range of 3.m to 5.m, for example.

Meanwhile, referring back to FIG. 1, fixed electrode pads 31b, 32b for wire bonding are respectively provided on specific positions of the wiring portions 31a, 32a for the fixed electrodes 31, 32. A movable electrode wiring portion 25 is formed to be integrated with the anchor portion 23b, and a movable electrode pad 25a for wire bonding is formed on a specific position of the wiring portion 25.

On the beam peripheral portions 33, electrode pads 33a, 33b for wire bonding are formed to keep the beam peripheral portions 33 at a given potential so that extra signals are not applied to the movable portion 20 during the sensor operation. The respective electrode pads 25a, 31b, 32b, 33a, and 33a are made of, for example, aluminum.

Further, several rectangular through holes 50 are formed in the weight portion 20, the movable electrodes 24, and the fixed electrodes 31, 32 to penetrate from the side of the opening 13a toward the opposite side. According to these through holes 50, a "Rahmen-structure" can be provided. The movable portion 20 and the fixed electrodes 31, 32 are lightened, and torsional strengths thereof are improved.

As shown in FIG. 2, the sensor 100 is bonded to a package 70 through adhesive 60 at a back surface side of the first silicon substrate 11 (at the opposite side of the substrate 11 with respect to the oxide film 13). The package 70 holds therein circuit means (detection circuit) 110 described later. The circuit means 110 is electrically connected to the electrode pads 25a, 31b, 32b, 33a, and 33b, respectively, by wire bonding using aluminum or gold wires or the like.

In this constitution, first capacitance CS1 is provided in the detection interval 40 between the first fixed electrode 31 and the movable electrode 24, and second capacitance CS2 is provided in the detection interval 40 between the second fixed electrode 32 and the movable electrode 24. When acceleration is applied, the entirety of the movable portion 20 is displaced in the displacement direction Y due to the spring function of the beams 22, and the detection intervals 40 change in accordance with the displacements of the movable electrodes 24, thereby changing the respective capacitances CS1, CS2. Then, the detection circuit 110 detects the acceleration based on the change in differential capacitance (CS1−CS2) between the movable electrodes 24 and the fixed electrodes 31, 32.

Figure 4:
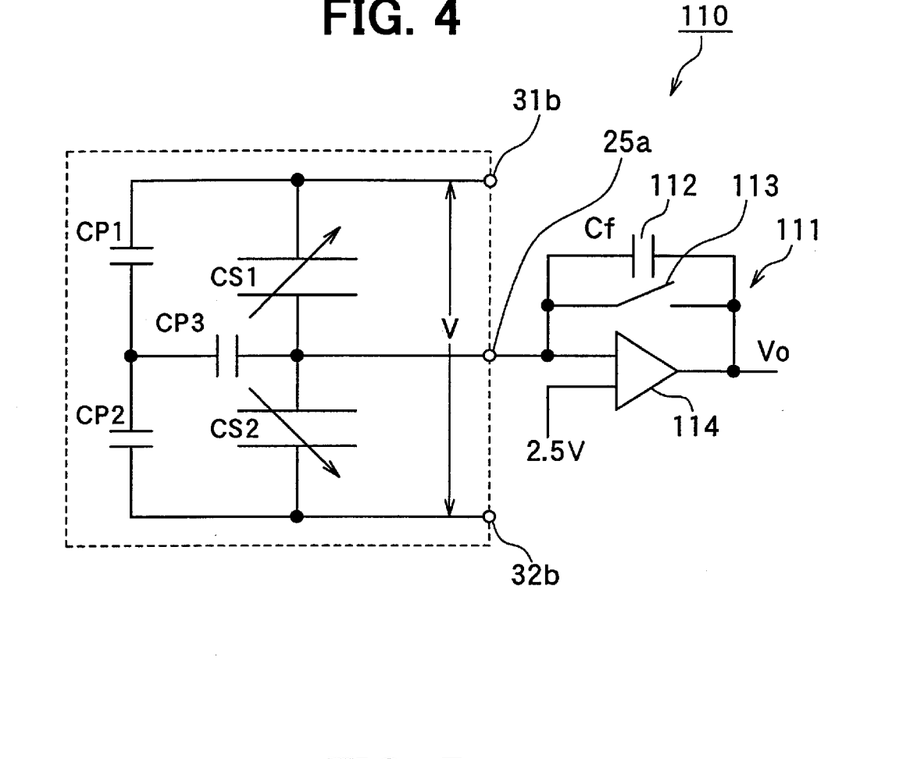
FIG. 4 is a diagram showing a constitution of a detection circuit of the semiconductor acceleration sensor in the first embodiment.

FIG. 4 shows a detection circuit diagram of the sensor 100. The detection circuit 110 includes a switched capacitor circuit (SC circuit) 111. The SC circuit 111 is composed of a capacitor 112 with capacitance Cf, a switch 113, and a differential amplifier circuit 114, and converts the differential capacitance (CS1−CS2) into a voltage.

CP1, CP2, and CP3 respectively denote parasitic capacitances. Specifically, CP1 is a capacitance between the wiring portion 31a of the first fixed electrode 31 and the support substrate 11, CP2 is a capacitance between the wiring portion 32a of the second fixed electrode 32 and the support substrate 11, and CP3 is a capacitance between the wiring portion 25 of the movable electrodes 24 and the support substrate 11.

Figure 5:
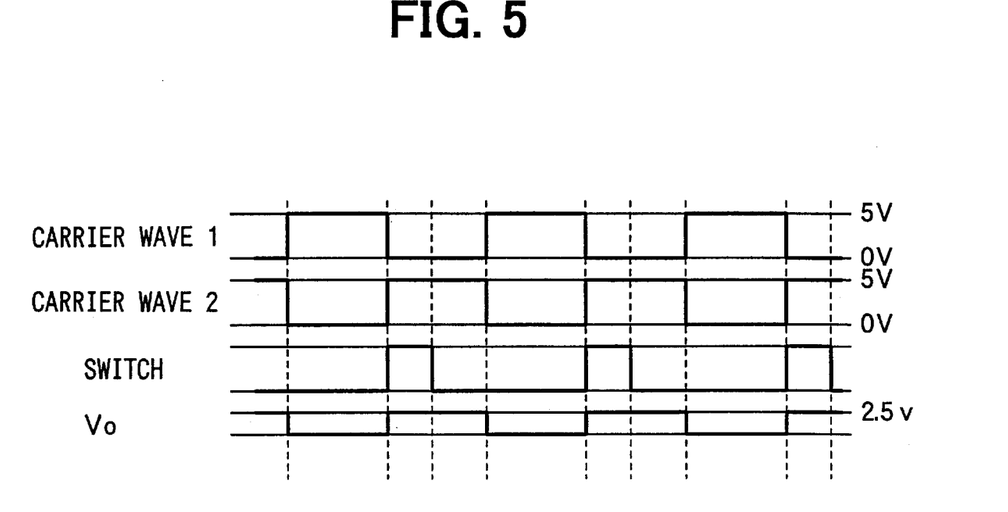
FIG. 5 is a timing chart with respect to the detection circuit.

FIG. 5 exemplifies a timing chart with respect to the detection circuit 110. In the sensor 100, for example, carrier wave 1 (having, for example, a frequency of 100 kHz and an amplitude of 0V to 5V) is inputted from the fixed electrode pad 31b, and carrier wave 2 (having, for example, a frequency of 100 kHz and an amplitude of 0V to 5V) is inputted from the fixed electrode pad 32b. The carrier wave 2 has a phase that is shifted from that of the carrier wave 1 by 180. Then, the switch 113 of the SC circuit 111 is opened and closed at the timings shown in the chart. The acceleration applied thereto is, as expressed by formula (1), outputted as voltage $V_0$.

$$V_0 = \{(CS1-CS2) + (CP1-CP2) \cdot CP3\} \cdot V/Cf \quad (1)$$

Next, a method for manufacturing the semiconductor acceleration sensor 100 is explained based on the structure as described above. First, the SOI substrate 10 is prepared. After an aluminum film is deposited on the entire surface of the second silicon substrate 12, the aluminum film is patterned by a photolithography technique and an etching technique. Accordingly, the electrode pads 25a, 31b, 32b, 33a, and 33b are formed.

Next, the back surface of the SOI substrate 10 (the surface of the first silicon substrate 11) is polished, and a plasma SiN film is deposited on the back surface and is etched to form an etching mask for forming the opening 13a. Successively, a PIQ (polyimide) film is coated on the surface of the SOI substrate 10 (the surface of the second silicon substrate 12) and then is patterned by etching into a shape corresponding to the movable portion 20 and the fixed portion 30. After that, resist is coated, as a protection film, on the PIQ film, and the SOI substrate is etched using the etching mask of the plasma SiN film and KOH solution. In this etching, because the oxide film 13 has an etching rate that is smaller than that of Si, the oxide film 13 works as an etching stopper.

Subsequently, after the plasma SiN film and the oxide film 13 exposed by the etching is removed by HF solution, the resist protecting the surface of the SOI substrate 10 is removed. Then, the groove 14, the openings 34, 35, and the through holes 50 are formed in the second silicon substrate 12 by dry etching using the PIQ film as a mask. Accordingly, the movable portion 20 and the fixed portion 30 are defined. Then, the PIQ film is removed by $O_2$ ashing. As a result, the sensor 100 is completed.

According to the present embodiment, the opposing intervals d2, d3 between the beam 22 and the beam peripheral portion 33 in the displacement direction Y are equal to the width d1 of the hollow portion of the beam 22. Therefore, the etching opening widths for the intervals and the hollow portion of the beam 22 opened by the dry etching as described above can be made identical with one another. Because of this, the etching rates at the etching portions can be made approximately equal to each other, and the processing variation of the beam 22 can be suppressed. Further, in this sensor 100, because the cross-sectional shape of the beam 22 can be made uniform in the etching direction, i.e., in the depth direction as shown in FIG. 3B, the spring function of the beam 22 is exhibited stably, resulting in stable sensor characteristics.

Figure 7:
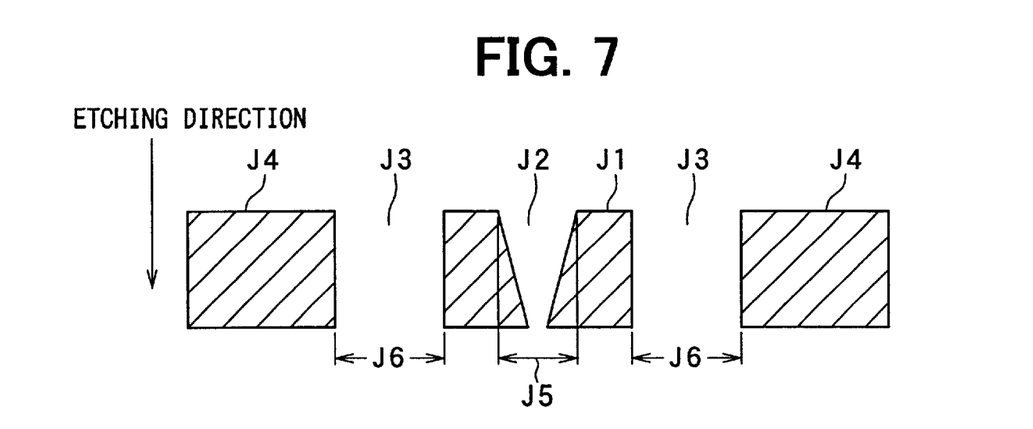
FIG. 7 is a cross-sectional view showing a beam formed by dry etching as a comparative example.

The above-mentioned advantages were experimentally confirmed using a comparative example shown in FIG. 7. In the comparative example, a beam J1 has a hollow portion J2 and is formed by dry etching to be separated from a fixed portion J4. In the example, a width J5 of the hollow portion J2 was set to be smaller than a width J6 of a groove J3 surrounding the beam J1. Generally, an etching rate of the dry etching becomes small as an opening width is narrowed, and the etching rate becomes large as the opening width is widened. Therefore, in the example shown in FIG. 7, the etching rate at the hollow portion J2 is slower than that at the groove J3. This results in variation of trench angle of the beam J1 between the outside of the beam J1 and the inside (the hollow portion side) thereof. Unlike the beam of the present invention, the beam J1 having such a shape cannot exhibit a spring function stably.

In addition to the advantages of the invention as described above, according to the present embodiment, the beam peripheral portion 33 has the openings 34 that are defined to face the beam 22 with the parts having the widths W3, W4, remaining and interposed therebetween in the displacement direction Y. The widths W3, W4 and the widths W1, W2 of the frame-shaped beam 22 in the displacement direction Y are set to be equal to one another.

When the dry etching is performed as mentioned above, the parts having the widths W3, W4 and the parts of the beam 22 having the widths W1, W2 are covered with the mask such as the PIQ film, as remaining parts. The mask material such as PIQ somewhat deforms by shrinkage in volume and the like when it hardens; however, the deforming degrees of the mask material on the remaining parts can be made approximately uniform if the widths W1 to W4 of the remaining parts are identical with one another. Accordingly, the dimensional accuracy of the remaining parts can be improved.

Also, according to the present embodiment, all of the opposing intervals d2, d3 between the beam 22 and the beam peripheral portion 33, the width d1 of the hollow portion of the beam 22, the widths d4, d5 of the openings 34 are made equal to one another. Therefore, the etching rates at the openings 34, the opposing intervals d2, d3, and the hollow portion are equal to one another, resulting in reduced processing variation of the openings 34.

Further, the opening 35 is provided in the beam peripheral portion 33 facing the end portion of the beam 22 in the direction perpendicular to the displacement direction Y with the remaining part of the peripheral portion 33 having the width W6. The width W6 is also set to be equal to the width W5 of the end portion of the beam 22. Therefore, even in the direction perpendicular to the displacement direction Y, the dimensional accuracy of the remaining parts can be improved, and the end portion of the beam 22 can be formed with high accuracy.

Figure 6:
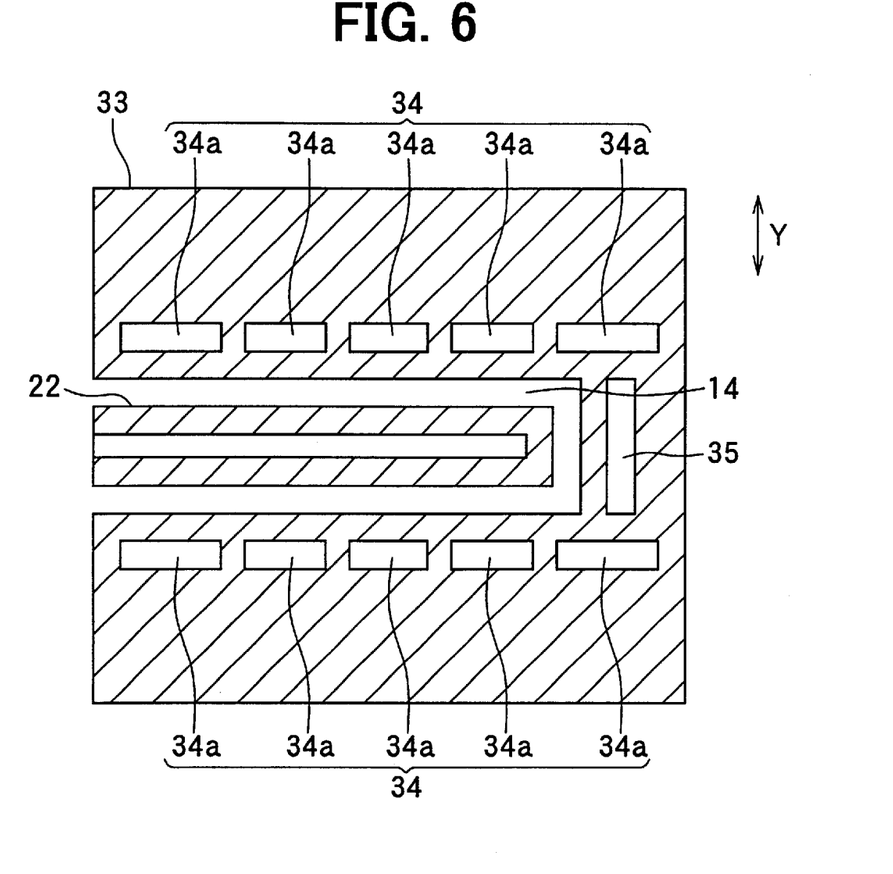
FIG. 6 is a plan view showing a beam and a beam peripheral portion facing the beam as a modification of the first embodiment.

The openings 34, which are formed in the beam peripheral portion 33 to face the beam 22 at the opposing sides in the displacement direction Y, may be shaped as shown in FIG. 6 in which the second silicon substrate 12 is hatched for easy recognition. Each of the openings 34 shown in FIG. 6 is composed of several rectangular openings 34a that are arranged in a line perpendicular to the displacement direction Y, thereby constituting a Rahmen structure. In consequence, the strength of each opening 34 can be enhanced as compared to the single opening 34 shown in FIG. 3A.

The most important feature in this embodiment is that the opposing intervals d2, d3 defined between the beam 22 and the fixed portion 30 (beam peripheral portion 33) in the displacement direction Y are set to be equal to the width d1 of the hollow portion of the beam 22 in the displacement direction Y so that the beam 22 can be processed to have a uniform beam shape and to exhibit a spring function stably in the displacement direction Y. The other features may be changed or modified appropriately.

The present invention may be applied to various physical quantity sensors such as a pressure sensor and an angular velocity sensor in addition to an acceleration sensor provided that the physical quantity sensor is formed from a semiconductor layer etched on a support substrate and that the sensor detects a physical quantity based on a change in interval between a fixed electrode and a movable electrode displaceable by a frame-shaped beam.

(Second Embodiment)

Figure 8:
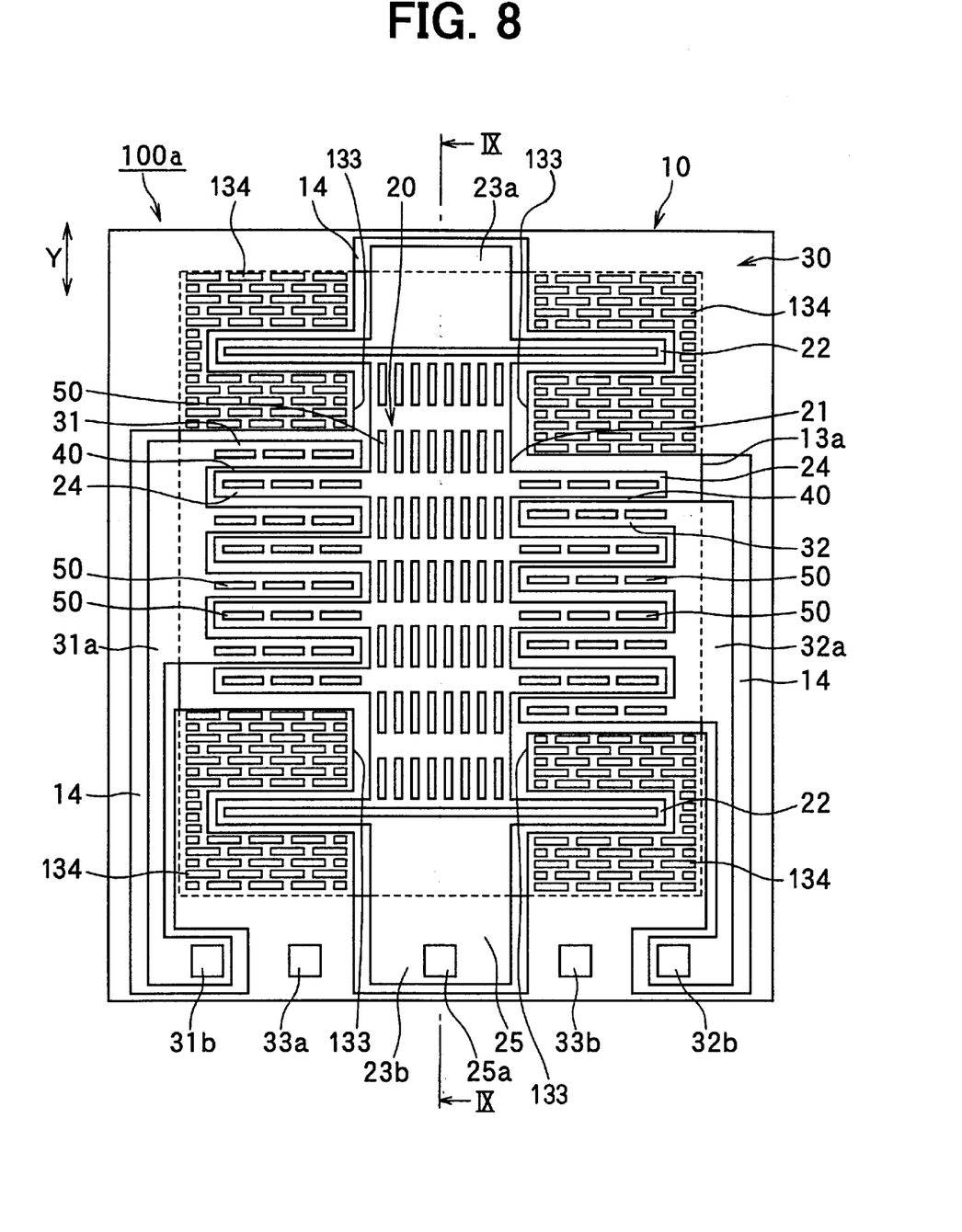
FIG. 8 is a plan view showing a semiconductor acceleration sensor according to a second preferred embodiment of the invention.
Figure 9:
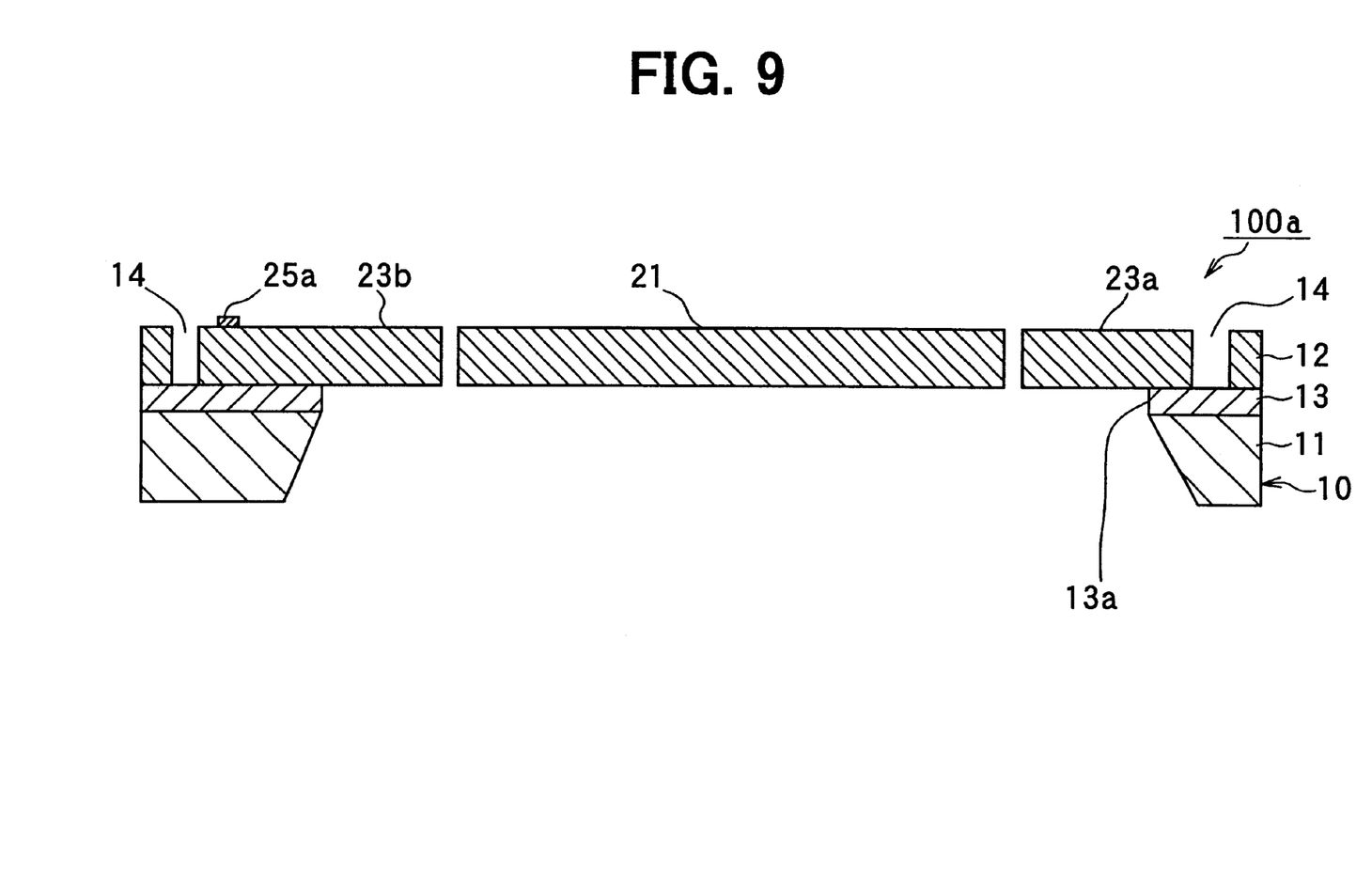
FIG. 9 is a cross-sectional view taken along line IX—IX in FIG. 8.

A semiconductor acceleration sensor 100a according to a second embodiment shown in FIGS. 8 and 9 is modified from the sensor 100 in the first embodiment to improve strength of a beam peripheral portion 133. In FIGS. 8 and 9, the same parts as those in the first embodiment are designated with the same reference numerals.

Specifically, the beam peripheral portions 133 of the sensor 10a are provided, as parts of the fixed portion 30, so as to surround the beams 22 (along the outer peripheries of the beams 22) via the groove 14, and intervene as intervening portions between the beams 22, and the fixed and movable electrodes 31, 32, and 24. The beam peripheral portions 133 are cantilevered by the support substrate 11, and are formed to be electrically independent of the movable portion 20 including the beams 22, and of the fixed electrodes 31, 32 due to the groove 14.

The beam peripheral portions (intervening portions) 133 have a Rahmen structure composed of plural rectangular frame portions 134 that are provided in a staggered arrangement (zigzag arrangement). Each of the rectangular frame portions 134 has a rectangular opening penetrating the second silicon substrate 12 in the thickness direction. Several frame portions 134 are arranged in a line and are shifted (offset) from other frame portions 134 arranged in an adjacent line.

Electrode pads 33a, 33b for wire bonding are formed on the specific positions of the beam peripheral portions 133 similarly to the first embodiment. When acceleration is detected, a voltage is applied from the detection circuit 110 to the beam peripheral portions 133 through the electrode pads 33a, 33b. Accordingly, the beam peripheral portions 133 are controlled to have a potential approximately equal to that of the movable portion 20 (beams 22).

Thus, in the present embodiment, the beam peripheral portions 133, which are independent of the beams 22 and the fixed electrodes 31, 32, are interposed between the beams 22 and the fixed electrodes 31, 32, and the potential of the beam peripheral portions 133 are controlled to be approximately equal to that of the beams 22. Accordingly, electrical interactions between the beams 22 and the fixed electrodes 31, 32 can be prevented. Therefore, the beams 22 do not perform unnecessary oscillation during the sensor operation, resulting in good sensor characteristics.

Because the beam peripheral portions 133 surround the beams 22 along the outer peripheries of the beams 22, the opening width of the groove 14 defined around the beams 22 can be decreased. Further, when the movable portion 20 and the fixed portion 30 are defined in the second silicon substrate 12 by etching, an etching rate at the periphery of each beam 22 can approach to that at the detection interval 40. Because of this, the processing variation of the beam 22 can be reduced, so that the beam 22 can have appropriate spring characteristics and the sensor characteristics can be attained appropriately.

Even when an excessive impact is applied to the sensor 100 to deform the beam 22 largely, because the beam peripheral portion 133 is formed to surround the beam 22, the beam 22 stops deforming by abutting the beam peripheral portion 133. Therefore, the beam 22 can be prevented from being deformed excessively. In consequence, the beam 22 can be prevented from being damaged.

Further, because the beam peripheral portion 133 has a Rahmen structure with the plural rectangular frame portions 134 disposed in a staggered arrangement, the beam peripheral portion 133 can be lightened as compared to the case where the beam peripheral portion has a plate-like shape without having the rectangular frame portions 134. Because the beam peripheral portion 133 is cantilevered by the support substrate 11, the lightened beam peripheral portion 133 can have improved bending strength and torsional strength.

Thus, according to the second embodiment, the fixed portion includes the beam peripheral portions 133 having improved strengths, thereby preventing deterioration of the sensor characteristics. As a result, the sensor 10a can exhibit high sensitivity at a widened range. The other features than the beam peripheral portions 133 are substantially the same as those of the first embodiment, but may be changed appropriately. The invention of the second embodiment may also be applied to various physical quantity sensors such as a pressure sensor and an angular velocity sensor in addition to an acceleration sensor.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A semiconductor physical quantity sensor for detecting a physical quantity, the physical quantity sensor comprising:
    a support substrate;
    a fixed portion fixed to the support substrate and having a fixed electrode;

a movable portion separated from the fixed portion through a groove and movably connected to the support substrate, the movable portion having a movable electrode extending to face the fixed electrode; and a beam connecting the movable portion and the support substrate and having a spring function for displacing the movable portion in a displacement direction, the beam having a rectangular frame shape with a hollow portion and being surrounded by the groove, wherein:

the hollow portion has a first interval in the displacement direction;

the groove surrounding the beam has second and third intervals at both sides of the beam in the displacement direction, both of the second and third intervals being equal to the first interval of the hollow portion.

2. The semiconductor physical quantity sensor of claim 1, wherein:

the beam has first and second portions extending perpendicularly to the displacement direction with the hollow portion interposed therebetween so that the frame shape is formed, the first and second portions having first and second widths in the displacement direction that are equal to each other;

the fixed portion includes a beam peripheral portion facing at least one of the first and second portions of the beam through the groove in the displacement direction; and the beam peripheral portion has an opening with a remaining portion defined between the opening and the groove, the remaining portion having a third width in the displacement direction that is equal to the first and second widths of the beam.

3. The semiconductor physical quantity sensor of claim 2, wherein:

the opening has a fourth interval in the displacement direction; and all of the first, second, third, and fourth intervals are equal to one another.

4. The semiconductor physical quantity sensor of claim 2, wherein the opening is composed of a plurality of rectangular opening portions that are arranged in a line perpendicular to the displacement direction.

5. The semiconductor physical quantity sensor of claim 2, wherein:

the beam peripheral portion faces an end portion of the beam through the groove in a perpendicular direction with respect to the displacement direction, the end portion having a fourth width in the perpendicular direction; and the beam peripheral portion has another opening with another remaining portion interposed between the another opening and the groove, the another remaining portion having a fifth width in the perpendicular direction, the fifth width being equal to the fourth width of the end portion.

6. The semiconductor physical quantity sensor of claim 1, wherein:

the fixed portion includes a beam peripheral portion facing an end portion of the beam through the groove in a perpendicular direction with respect to the displacement direction, the end portion having a first width in the perpendicular direction; and the beam peripheral portion has an opening with a remaining portion interposed between the opening and the groove, the remaining portion having a second width in the perpendicular direction, the second width being equal to the first width of the end portion.

7. The semiconductor physical quantity sensor of claim 1, wherein:

the beam has first and second portion s extending perpendicularly to the displacement direction with the hollow portion interposed therebetween so that the frame shape is formed, the first and second portions having first and second widths in the displacement direction that are equal to each other;

the fixed portion includes a beam peripheral portion facing the first and second portions of the beam through the groove at both sides of the beam in the displacement direction; and the beam peripheral portion has first and second openings with first and second remaining portions defined between the first opening and the groove and between the second opening and the groove, the first and second remaining portion having third and fourth widths in the displacement direction, each of the third and fourth widths being equal to the first and second widths of the beam.

8. The semiconductor physical quantity sensor of claim 1, wherein the fixed portion and the movable portion are formed from a semiconductor layer disposed on the support substrate and etched to form the groove.

9. The semiconductor physical quantity sensor of claim 1, wherein:

the fixed portion includes a beam peripheral portion that is provided to surround the beam through the groove and to intervene between the beam and the fixed electrode; and the beam peripheral portion has a plurality of rectangular openings that are provided in a staggered arrangement.

10. A semiconductor physical quantity sensor for detecting a physical quantity, the physical quantity sensor comprising:

a support substrate;

a fixed portion fixed to the support substrate and having a fixed electrode;

a movable portion separated from a fixed portion through a groove and movably connected to the support substrate, the movable portion having a movable electrode extending to face the fixed electrode; and a beam connecting the movable portion and the support substrate and having a spring function for displacing the movable portion in a displacement direction, wherein:

the fixed portion includes a beam peripheral portion that is provided to surround the beam through the groove and to intervene between the beam and the fixed electrode; and the beam peripheral portion has a plurality of rectangular openings that are provided in a staggered arrangement.

11. The semiconductor physical quantity sensor of claim 10, wherein the plurality of rectangular openings includes a first plurality of opening portions that are arranged in a first line perpendicular to the displacement direction, and a second plurality of opening portions that are arranged in a second line parallel to the first line, the first plurality of opening portions being offset from the second plurality of opening portions.

12. The semiconductor physical quantity sensor of claim 10, wherein the beam peripheral portion is electrically independent of the beam and the fixed electrode.

* * * * *